United States Patent [19]

Theimer et al.

[11] Patent Number: 5,627,517
[45] Date of Patent: May 6, 1997

[54] DECENTRALIZED TRACKING AND ROUTING SYSTEM WHEREIN PACKAGES ARE ASSOCIATED WITH ACTIVE TAGS

[75] Inventors: Marvin M. Theimer; Roy Want, both of Mountain View, Calif.

[73] Assignee: Xerox Corporation, Stamford, Conn.

[21] Appl. No.: 548,360

[22] Filed: Nov. 1, 1995

[51] Int. Cl.[6] .................................................. G08B 13/14
[52] U.S. Cl. .................... 340/572; 340/505; 340/825.49; 342/44; 455/88
[58] Field of Search ............................ 340/572, 539, 340/505, 825.49, 825.54, 825.31, 825.34, 825.35; 455/73, 88, 89; 342/42, 44, 51; 364/403, 478.01, 479.01; 235/385

[56] References Cited

U.S. PATENT DOCUMENTS

| | | | |
|---|---|---|---|
| 3,772,668 | 11/1973 | Smith | 340/572 X |
| 4,068,232 | 1/1978 | Meyers et al. | 342/44 |
| 4,217,588 | 8/1980 | Freeny, Jr. | 342/458 |
| 4,275,385 | 6/1981 | White | 340/825.49 |
| 4,688,026 | 8/1987 | Scribner et al. | 340/572 |
| 4,832,204 | 5/1989 | Handy et al. | 235/385 X |
| 4,952,928 | 8/1990 | Carroll et al. | 340/825.54 |
| 5,027,314 | 6/1991 | Linwood et al. | 364/460 |
| 5,122,959 | 6/1992 | Nathanson et al. | 364/436 |
| 5,347,274 | 9/1994 | Hassett | 340/988 |
| 5,406,275 | 4/1995 | Hassett et al. | 340/933 |
| 5,491,486 | 2/1996 | Welles, II et al. | 342/357 |

*Primary Examiner*—Thomas Mullen
*Attorney, Agent, or Firm*—R. Hutter

[57] ABSTRACT

In a freight tracking and routing system, each individual package is provided with a tag physically attached thereto. The tag includes a radio or infrared transceiver, and a microprocessor. At important nodes at geographical locations within the distribution system, location transceivers broadcast signals representative of their locations. The microprocessor, in response to receiving a desired destination signal, emits a signal commanding external equipment to take the package so that it remains at the desired location. The tags are also capable of being electronically queried, or alternately can emit distress signals when they do not reach a particular location at a particular time.

24 Claims, 3 Drawing Sheets

DECENTRALIZED TRACKING AND ROUTING SYSTEM WHEREIN PACKAGES ARE ASSOCIATED WITH ACTIVE TAGS

The present invention relates to a decentralized package-tracking and routing system, for use in freight-handling and other distribution systems. More specifically, the present invention relates to a tracking system which is largely decentralized, and in which control over the destination of each package mainly resides with each package itself.

Freight tracking systems for tracking the location of large numbers of packages in a distribution system are well-known. Such systems are commonly used as inventory control systems in manufacturing situations and are also common in delivery services such as UPS or airlines. Many such systems common in the art involve the proprietor of the tracking system, such as the post office or airline, identifying individual packages as they enter the system with a special mark peculiar to the system. For example, it is common to check baggage in an airport and have each bag receive a sticker with a bar-code thereon. This bar-code is then used by the airline's own equipment to monitor the passage of the bag through the baggage system. The use of bar codes and other identifying marks typically requires the use of a centralized system which must extend to the borders of the physical system; for example, from the time a bag is being checked at one airport until it is picked up at another airport, one central control common to the entire airline must be able to not only to recognize the bar-code but be able to determine the location of the bag with reasonable precision at any time.

There are certain disadvantages to this commonly-used system. First, there is no reason that a bar-code system dedicated for the use of one system proprietor (such as an airline) could or should be compatible with the bar-code system of another proprietor: a bar-code sticker placed on a bag by an airline could be rendered as nonsense when read by the equipment of another freight-handling system. Compatibility in this respect is not required, and in some situations may not even be desired. Also, centralized systems, because they must cover the entire territory of an airline or freight system, must have enormous data-processing capabilities in order to keep track of enormous numbers of bags or packages: a single computer system must in effect be able to "cover" airports on several continents in the case of an international airline, or more likely several computers on different continents must be able to readily communicate with each other and be able to access large amounts of data from each other if necessary. As airlines and freight systems grow, the necessary capability of a "core" central control unit for handling freight will require a proportional amount of memory and other computing capability.

In the prior art, U.S. Pat. No. U.S. Pat. No. 4,068,232 discloses a tracking system in which the objects being tracked, such as cargo and trailers, are provided with passive transponders. When the objects having the transponders move through an interrogator beam, some of the beam's energy powers the transponder, which generates a signal bearing unique transponder information. The transponder information can then be decoded to derive an identification number for the object.

U.S. Pat. No. U.S. Pat. No. 4,217,588 discloses a road-navigation system wherein "signpost" units are positioned at predetermined geographical locations. Each signpost unit transmits a binary code for reception in units installed in moving vehicles. The units receive the signpost codes from adjacent signposts in order to determine the location of the vehicle. The units are operable in an automatic reporting mode, in which the location of the monitored vehicles is reported only when the vehicle enters a different coverage region, a region or route reporting mode, wherein only vehicles within a predetermined region or on a predetermined route report to the base station, and in a polling mode, wherein only the locations of predetermined monitored vehicles are reported to the base station.

U.S. Pat. No. U.S. Pat. No. 4,275,385 discloses a personnel locator system wherein persons carry battery-powered transmitters which emit unique infrared identification codes. The infrared transmission is received by overhead infrared receivers in a building. The transmitter identification code together with the receiver identification code is communicated to a common control unit which displays the location of all of the transmitter units.

U.S. Pat. No. U.S. Pat. No. 4,658,357 discloses a wrist-transmitter that transmits a code signal every fifteen seconds so the wearer can be located by one of a set of short-range receivers. The location information can be received and logged, and report on the behavior of the wearer generated.

U.S. Pat. No. U.S. Pat. No. 4,688,026 discloses a system wherein different locations and objects are assigned tags which are capable of wirelessly transmitting unique codes when energized by RF energy. A user searching for an object moves an RF antenna sufficiently close to the tag to energize it and cause the tag to transmit its code.

U.S. Pat. No. U.S. Pat. No. 4,952,928 discloses a personnel monitoring system which includes a transponding unit that is worn or carried by the individual being monitored. Periodically or on request, the transponder unit transmits a unique signal that identifies the person being monitored. The system can also be used to monitor activities of the person being monitored, such as heart rate or muscle movement.

U.S. Pat. No. U.S. Pat. No. 5,027,314 discloses a tracking system wherein one transmitter is associated with each subject being tracked. Each transmitter transmits a light based signal representing a unique identifying code. Receivers are associated with each of a plurality of geographical areas. A central processing member connected to each of the receivers records electrical signals derived from the light-based signals from each unique transmitter.

U.S. Pat. No. U.S. Pat. No. 5,122,959 discloses a vehicle dispatch system wherein a plurality of work stations each contains a digitized map base of different vehicle delivery areas. The system calculates minimum travel time based upon a tree-node decision algorithm, and selects vehicles for various pick-ups and deliveries.

The present invention provides a system by which each package in a freight-tracking system is provided with an intelligent agent, in the form of a "tag" including a microprocessor, by which, in effect, each individual package is responsible for routing itself, so that the need for central control of individual packages in a system is minimized or obviated.

According to one aspect of the present invention, there is provided a method of managing a plurality of non-self-propelled packages in a distribution system. A package transceiver is physically asscoaited with each package. A location transceiver is disposed at each of a plurality of fixed nodes in the distribution system. Each location transceiver communicates a unique location code to a package transceiver at the node. Each package transceiver is programmed with a destination code representative of a location in the distribution system where the package is intended to be disposed. The package transceiver transmits an activity signal in response to receiving the location code of the location transceiver related to the destination code.

According to another aspect of the present invention, there is provided a tracking apparatus adapted to be attached to a non-self-propelled package, comprising a transceiver and a processor operatively associated with the transceiver. The processor retains a destination code representative of a location in the distribution system where the package is intended to be disposed, recognizes a location code broadcast from an external location transceiver, and transmits an activity signal in response to recognizing a location code of the location transceiver related to the destination code.

Figure 1:
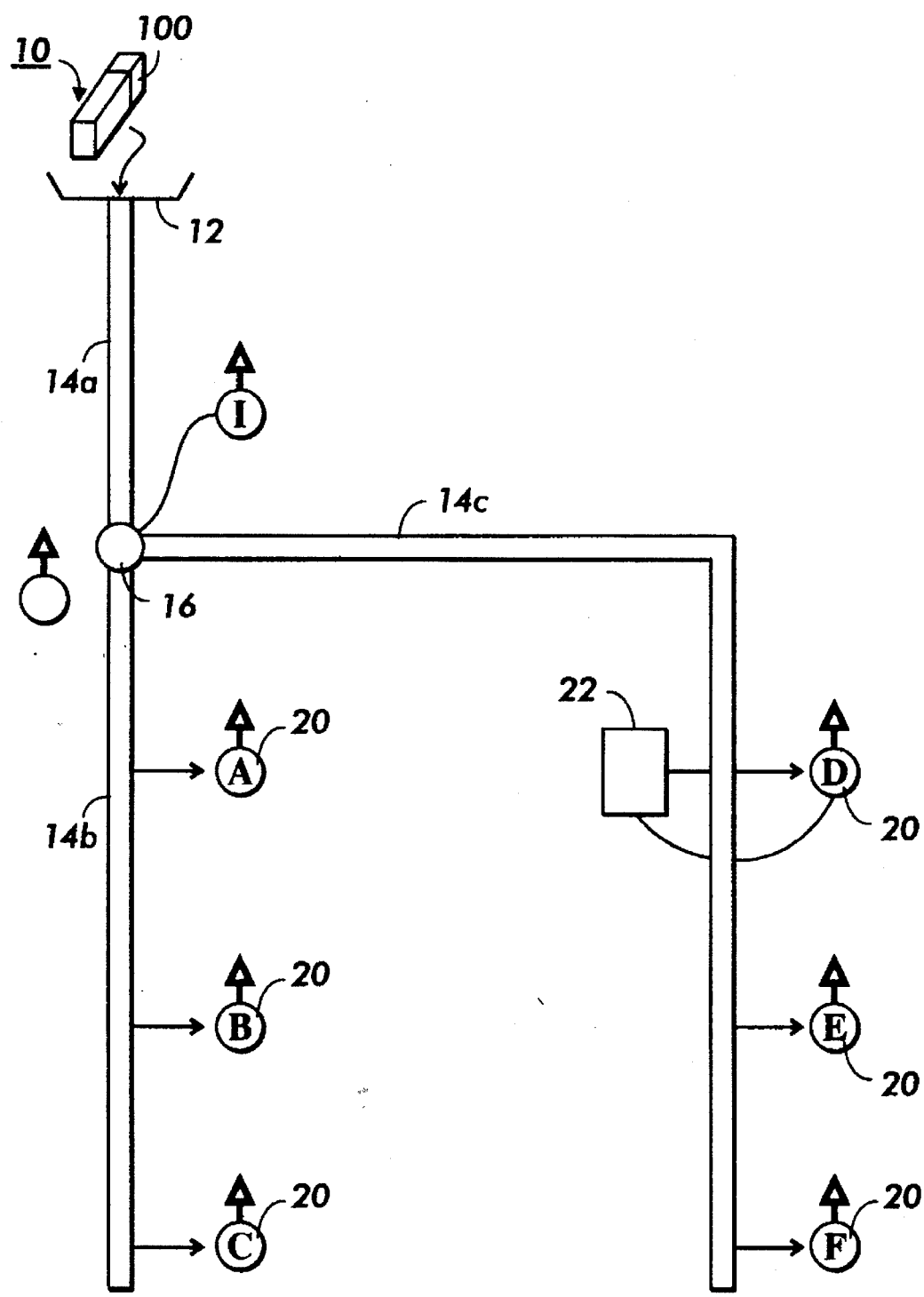
FIG. 1 is a simplified systems view of a typical freight-distribution system utilizing different aspects of the tracking system of the present invention.

FIG. 1 is a simplified systems view of a typical freight-distribution system utilizing different aspects of the tracking system of the present invention. A series of packages, such as indicated by 10, enter the system at an input point such as 12, from which the series of packages are loaded on a system of conveyors generally indicated as 14, with the different branches of the conveyor system being indicated as 14a, 14b, and 14c. The invention is generally directed to handling of non-self-propelled packages, as opposed to vehicles. The branches 14b and 14c of conveyor 14a split at a diverter 16. As used in the claims herein below, any point in the tracking system deemed important for the tracking process can be designated a "node." In the illustrated example, a package 10 entering the system at input port 12 can be selectably directed to one of six destination nodes, here indicated by letters A–F. These destination nodes may represent, for example, bulk containers to be loaded onto a plane going to a particular destination, or trucks backed at a loading dock, etc. The symbol associated with each destination letter A–F indicates that there is associated, at some point geographically related to the destination, such as a loading dock or a bulk container, a radio transceiver 20, indicated by the antenna symbol on each destination node A–F. Also, the area of the system just before the diverter 16 can be designated a "node" as well, and is here shown with a transceiver representing an input node I.

The general principle behind the present invention is that each package is ultimately responsible for its own fate in the distribution system, as opposed to a centralized system in which each package being tracked is a passive object under the control of a central control system. Each package 10 has permanently associated therewith a transceiver, or "tag" 100, which may have different subsystems as will be described in detail below, which essentially includes a transceiver and a microprocessor. The transceiver can be of a radio or infrared-communication type, and is adapted for short-range communication with other transceivers within a reasonable geographical vicinity of the package at any time. The microprocessor associated with the transceiver in tag 100 is capable of sending and/or understanding coded messages through the transceiver. As used in the claims herein, a "transceiver" shall mean an apparatus which is capable of receiving or transmitting a signal, even through in certain embodiments a particular transceiver will be called upon for only one such function.

Upon entering the distribution system, the package 10, with its associated tag 100, can be queried at an input transceiver I. The input transceiver I broadcasts to the tag 100 a query message which solicits, in the microprocessor in tag 100, a response to the input transceiver I in which the tag 100 of package 10 essentially says "I want to go to [for example] destination node D." In the context of a distribution center, destination node D may represent a bulk container for a plane or truck going to a particular city.

Input transceiver I can be operatively connected to any portion of a downstream conveying system which can influence the input package 10 reaching its desired destination. In the present embodiment, input transceiver I is operatively connected to a diverter 16 at a transfer node, which can divert a particular package 10 to either conveyor 14b or 14c, depending on the desired ultimate destination. If the desired destination node for a package 10 is D, input transceiver I can influence diverter 16 to divert the package 10 to conveyor 14c. This is an example of a situation wherein information from the tag 100 influences external equipment to direct the package.

The tag 100 associated with the package 10 can also be used to respond to external stimuli in order to ensure the package 10 is routed to the desired destination. According to one embodiment of the present invention, the transceiver associated with each destination node A–F continuously broadcasts, such as by radio signals an identification code. When received by an appropriate transceiver on a package such as 10, the essential meaning of the message broadcast by the transceiver 20 associated with a destination node is "you are at destination node - - - " The transceivers 20 associated with the destination nodes provide signals which can be received by the tags 100 physically associated with each package 10. For example, the package 10, having been diverted at node 16 onto conveyor 14c, will be exposed to broadcast signals from the transceivers 20 for destination nodes such as D–F along conveyor 14c. In the present example, it is desired that the package 10 end up at destination node D; therefore, it is to be expected that, once the package 10 reaches destination D along conveyor 14c, the package will remain at destination node D for an appreciable length of time, and therefore the transceiver in tag 100 associated with package 10 will be receiving the broadcast signal from the transceiver at destination node D for an appreciable length of time as well. Further, the transceiver in tag 100 will not be exposed for long periods to the broadcast signals from non-desired destination nodes: the transceiver on tag 100 should only be exposed to non-desired broadcast signals for the short amount of time in which the package passes the transceiver of a non-desired destination node in route to another node.

The fact that a tag 100 of a package 10 is intended to be exposed only briefly to non-desired destination node broadcast signals, and receives the broadcast signal of the desired destination code for an extended period of time, can be exploited for various purposes. If the package 10 is moving along a conveyor system, the tag 100 can interact with both the broadcast signal at the destination node and any ancillary equipment to divert the package toward the destination node along the conveyor. For example, if the package 10 is desired to be sent to destination node D, the tag 100 can respond to receiving the broadcast signal from the destination node D with sending an instruction to ancillary equipment along conveyor belt 14c that, in effect, "this is my stop, let me off here." In other words, at destination node D (or at any other destination node) the transceiver 20 associated with the destination node not only broadcasts its identity, but is also sensitive to signals from the tags on the packages, which can be interpreted to indicate that an apparatus such as generally indicated by 22 can push the package 10 off of the conveyor 14c and into long-term association with destination node D (i.e., by pushing the package 10 into the bulk container, or depositing the package 10 by a particular loading dock, so that the tag 100 receives the broadcast signal from transceiver 20 at destination node D for a reasonably extended length of time).

The underlying concept oil the present invention, that each package has associated therewith its own "intelligent" tag which retains the desired destination of the package, presents fundamental advantages over prior-art systems. First, in many freight-tracking systems in current use, packages entering a system are provided with a passive routing system, such as a bar-code sticker which is provided by the proprietor of the distribution system. Typically, these bar-codes or other passive tags are (1) provided by the system proprietor on a mass-production basis, and (2) dedicated to the particular tracking system used by the system proprietor. The key disadvantage of (1) is that when a non-interested person types in the package destination data for a large series of packages to create bar-codes, the chance of human error over a large series of packages is relatively high. The disadvantage of (2) is that different distribution systems run by different entities tend to be incompatible with each other. For example, the Post Office, private air-freight companies, airlines, and internal systems used by users of these systems are all mutually exclusive.

The advantages of the present system include the fact that the tag 100 for a package 10 is assigned a desired destination before it enters the distribution system, typically by the owner of the package and not the proprietor of the tracking system. Because the owner of the package has a greater interest in avoiding mistakes in programming the destination of the package, the chance of error in entering a destination is significantly reduced. The combination of transceiver and microprocessor in tag 100 can also be used to maintain the package in some type of contact with the owner of the package even as the package moves through a distribution system owned by someone else. It will be noted in FIG. 1 that a truly centralized tracking system, in control of every node illustrated in FIG. 1, is not necessary to realize the system: the system controlling, for example, node D does not have to know about nodes E or F. Indeed, more nodes G, H, J (not shown) can be added at the end of conveyor 14c without any effect on the operation of transceiver 20 or diverting equipment 22 at node D. In prior-art systems, there would probably have to be some master controller influencing, ultimately, every node in the system. All that has to be known by the control system at input port I is that certain nodes are located along conveyor 14b and others are located along 14c; of course, if one wanted a purely linear system in which all nodes are along the same conveyor, even this input node I would be unnecessary.

Figure 2:
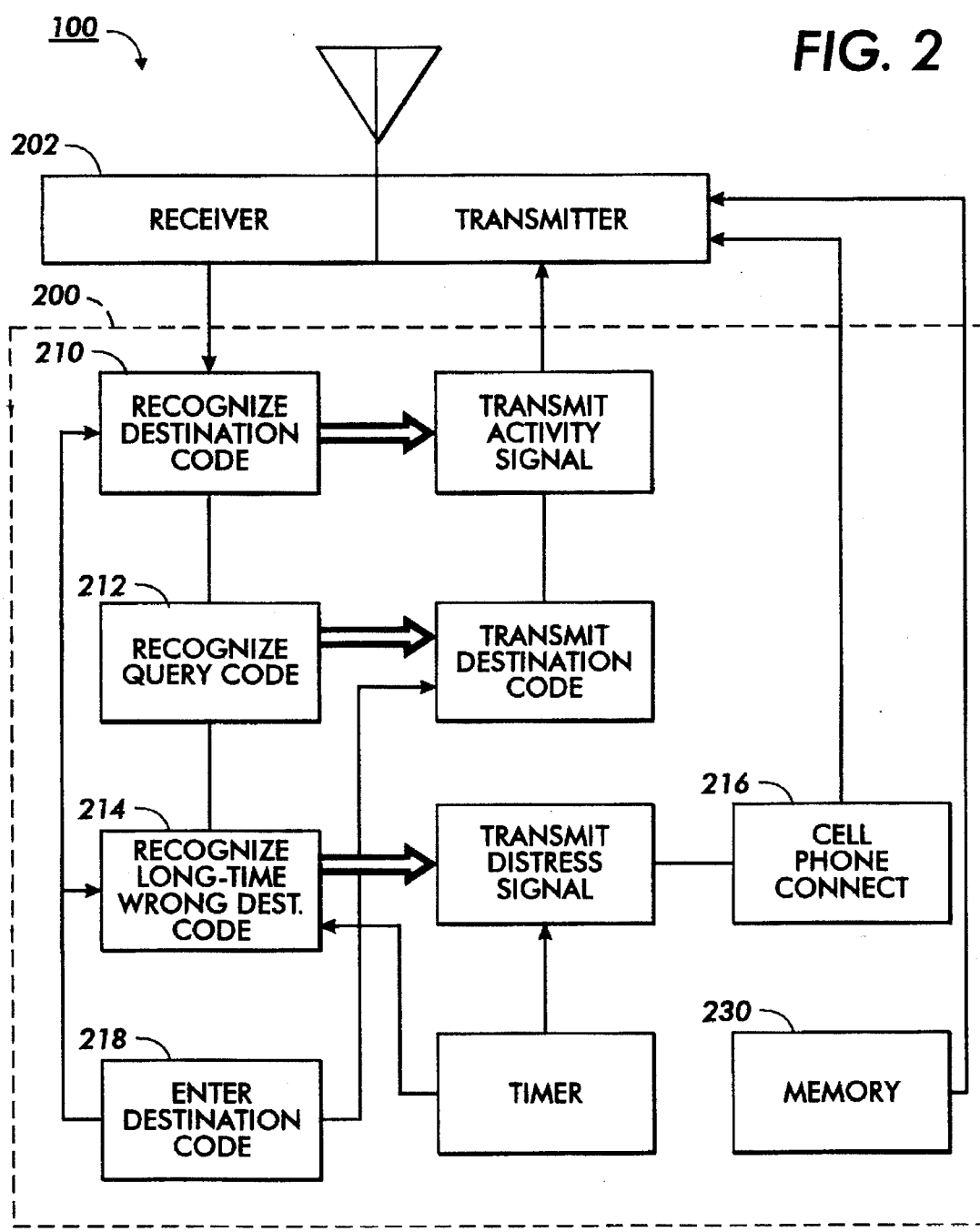
FIG. 2 is a simplified systems diagram showing the essential functionality of a tag according to the present invention.

FIG. 2 is a simplified systems diagram showing the essential functionality of a tag 100 for use with the present invention. The tag 100 generally comprises a low-power microprocessor, such as generally indicated by 200, in combination with a radio or infrared transceiver indicated as 202. Both microprocessor 200 and transceiver 202, under typical conditions, can be manufactured in a relatively small package which can be readily attached to a package, or buckled to a handle of a suitcase, for example. It will further be evident that the tag 100 can include its own power source, such as a battery (not shown). The following description will show that a great deal of systemic functionality can be achieved using relatively simple detection-and-response algorithms on a microprocessor for each tag 100. The smaller boxes within the dotted box indicating microprocessor 200 are intended indicate the basic functionality of algorithms programmed onto microprocessor 200.

According to the basic aspect of the present invention, the tag 100 of a particular package need only be programmed to recognize two types of external signals: a destination code, which is unique to any local destination node broadcasting a signal, and also, according to another aspect of the invention, a query code, which is a special code which, when received, will cause the microprocessor 200 to send out information identifying itself. With reference to FIG. 1 above, when the receiver portion of transceiver 202 receives a signal which is recognized as the broadcast signal of a desired destination for the package, the microprocessor 200 will respond to this desired destination signal, as shown at the function marked 210, by transmitting what is here called an "activity signal." The activity signal is a signal to nearby equipment that the package is at its destination, and that ancillary equipment at the destination should take the package, or otherwise perform some relevant physical action on the package. Referring back to FIG. 1, an example of this "activity" is commanding local equipment to push the package off the conveyor belt at the desired location. This activity signal can be very general in meaning (i.e., "take me") and local equipment such as a conveyor belt or robot arm can respond as necessary to this activity signal. The package itself does not care exactly how it is handled in response to the transmission of an activity signal.

It may also be desirable, in some situations, that the microprocessor 200 recognize receiving a query signal from an external source, such as at the input node of a distribution system as shown in FIG. 1. Like the activity signal, the query signal can be of great generality in meaning (i.e., "tell me where you are going") and, in response to receiving this query code, the microprocessor 200 will cause to be transmitted through transceiver 202 at least a destination code, as shown by the function marked 212. By eliciting the destination code, an external system can direct the package to its destination. Although it may be possible that the microprocessor 200 could transmit more information, such as a unique package identification code, or the name and address of the sender, this extra information is generally not necessary for operation of the system, and in fact there may be a desire to keep individual packages anonymous. Generally all that a distribution system is interested in is the destination of the package, and not its origin.

The microprocessor 200 of tag 100 can also be made sensitive to situations in which it is believed that something has gone wrong, and each individual tag 100 can take steps to flag the error. For example, the microprocessor 200 may be provided with a timer, and may suspect something is wrong when a predetermined relatively long period of time has passed without receiving any proper destination code, or by receiving a wrong destination code for a predetermined period of time. In either case, the microprocessor may be recognizing a situation in which either the package has fallen out of the system completely (by no longer being in range of any node transceiver) or has been directed to the wrong destination (because it is consistently receiving broadcast signals from the transceiver of a non-desired destination node). In this case, microprocessor 200 is programmed to transmit, through transceiver 202 or otherwise, a "distress signal." In a basic sense, a tag 100, finding itself out of the system completely, or not at its desired destination within a few days, can emit a distress signal in the form of an audible signal emitted through a speaker (not shown). Alternately, the microprocessor 200 may try to make contact with its owner through means which can circumvent the short-range infrared or radio communication of the transceiver, by using the transceiver not for its usual purpose but for contacting its owner directly, such as through a cellular phone contact, illustrated as 216. In such a situation, microprocessor 200 can literally "call up" its owner and send a message which can be interpreted as "I have not yet reached my destination." In this way, a tag 100 can circumvent not only the physical freight-handling system, but can circumvent the proprietor of the freight-handling system, such as the airline or freight company, and report directly to its owner.

The microprocessor 200 also includes provision, indicated at 218, for entering the destination code onto the tag 100 before it is attached to a package and sent. This entry of the destination code can be performed either through the transceiver 202, or, preferably, through a jack and wire (not shown) forming part of the tag itself. Other parameters, such as expected length of delivery time (which will effect when distress signals will be sent out) can be entered as well.

For purposes of each tag 100 being able to locate itself with some desirable degree of precision over time, an important modification to the basic invention would be to program both the general system and the individual microprocessor to hunt for a "hierarchical" recognition of broadcast signals at various nodes. For example, if in an air-freight system, regular zip codes are used to identify destinations, the fact that zip codes are not randomly distributed, but rather associated with specific regions of the country, can be exploited. For example, if a sender in zip code 14644 in New York desires to send a package to, zip code 94304 in California, and the various nodes through the country are each provided with transceivers that merely broadcast the local zip code, microprocessor 200 can be programmed to, for example, transmit a distress signal if, after three days, the first number of the local zip code is not 9, or if the zip code it is currently receiving does not begin with 943. A system could be provided which causes the tag 100 to transmit its last-received zip code or destination code with its distress signal, along with the time of last receipt of any such broadcast signal.

Figure 3:
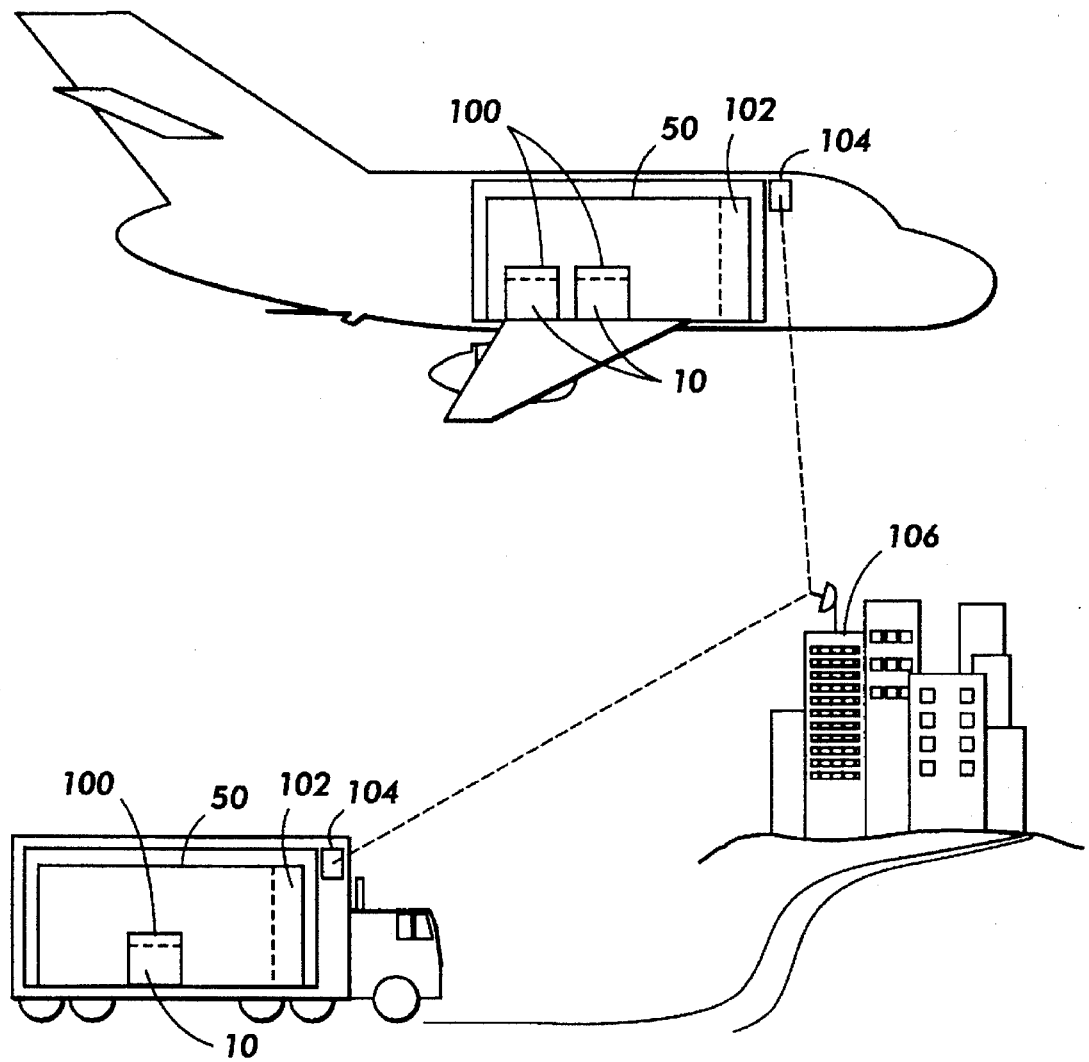
FIG. 3 is an illustration of how the tracking system of the present invention can be cascaded for different applications.

Another key advantage of the present invention is that the system is expandable for applications not only within a distribution within a single building, but can be extended into a world-wide system. FIG. 3 shows packages such as 10 with associated tags 100, loaded respectively in bulk containers 50, which in turn can be disposed within an airplane, as shown, or in a truck. It will be noted that, in both the airplane and the truck, the bulk container 50 has associated therewith a transceiver tag 102. The tag 102 operates in the same manner as the tags 100 associated with each package 10. The tags 100 associated with each package 10 can, by their close proximity, communicate with the tags 102 associated with bulk packages 50. Similarly, either tag 100 or tag 102 can interact with a tag 104 which is associated with either the airplane or the truck. Further, the tags 104 associated with the airplane or truck can conceivably communicate with a large-scale transceiver such as 106 which is permanently associated with, for example, a destination city. The tags such as 102, 104, and 106 can broadcast destination codes which are cascaded through each respective tag so that a tag 100 associated with a package 10 can detect, by the nature of the broadcast signals it receives, that a package is or is not in the right bulk container, that the bulk container is on a truck or airplane intended for the correct destination, and that the truck or airplane is indeed heading toward the correct destination.

The above illustrated embodiments of the system of the present invention are directed to the most basic aspects of such a system, showing the general communication between "smart" tags or transceivers associated with packages interacting with transceivers associated with geographical points along a route. However, there, may be incorporated a number of sophisticated variations to enhance the performance and versatility of such a system. Below are described a number of modifications to the above-described basic system, which can be incorporated, for example, as further instructions within microprocessor 200. These modifications allow the tags to interact in more complex ways with the routing stations.

One variation of the system of the present invention is to provide in a memory, such as shown as 230, associated with microprocessor 200 of each tag 100 information not only about the ultimate destination of the package, but a sequence of destinations, i.e., location codes for a sequence of routing stations that must be taken from the sender's location to the desired ultimate destination. That is, for a package sent from California to Zimbabwe, it is likely that such a package will be first placed on a truck, sent to a distribution center, placed on another truck, taken to an airport, and taken on a series of airplanes, etc. on its way. Under the system of the present invention, the sender in California can map out a desired sequence of steps such as truck 1, distribution center 1, truck 2, airplane 1, distribution center 2, airplane 2, etc., into the memory associated with microprocessor 200. In this way, the sender not only "addresses" the package by entering the ultimate destination in memory, but rather maps out a specific route, as defined as a set of trucks, distribution centers and airplanes, etc., as a set of directions from the sender's location to the destination. If the package tag 100 has in memory 230 the full set of instructions to arrive at its destination, the tag could communicate, for example, to a UPS truck that the next point it wanted to go to was the airport, and not any further information which UPS would have no control over, such as instructions involving the airline, or the Zimbabwean Postal Service. By providing information in the tag at a low level of specificity, such as which truck to get on, what plane to get on, etc., as much intelligence as possible for determining where the package will go will remain with the package tag.

By placing the low-level instructions in the tags themselves, the individual routing stations at fixed points in a system can therefore be made as a "passive" as possible. This would lower the amount of information that would have to be stored at each individual routing station in a system. Another advantage of placing most of the intelligence on the tags, as opposed to at fixed routing stations, is that the design can be scaled to large systems that allow multiple independent transport services, such as postal services and airlines, to cooperate with each other. It is generally less expensive to add instructions in non-volatile memory on each tag, each tag instructing its immediate environment where it wants to go in the short term (a particular truck, for example) than to provide each routing station with relatively sophisticated decision making capabilities.

Putting a relatively large amount of information on the package tag also enables the concept of corrective rerouting. Under one variation to the system of the present invention, a tag interacts with nearby routing stations to have itself rerouted back to its correct route when misrouting is detected, such as by the presence of incongruous, or unknown location codes detected by the tag. Rerouting could be accomplished, for example, by having the tag record the set of routing stations that it has passed and then constructing a modified route for itself by tracing its actual route back to the last location code that was correct and then continuing on with the remainder of the correct route that was originally programmed therein. Once the tag detects that it is not on the right route, such as by not receiving a particular location code in is pre-programmed series of location codes after a certain period of time, the transceiver can contact the nearest external transciever (such as at a particular node) and signal to be sent back to the node associated with the last correct location code.

Another variation to the system of the present invention is to provide for broadcast by a given tag special information about the package, such as whether the package is fragile or contains dangerous materials. If the tag forewarns a particular location that, for example, it is highly flammable, the location could be programmed to refuse the package, or select for the package an alternate route. An airport baggage router may wish to reroute packages broadcasting an "I'm fragile" message to a special conveyor belt that is manned by humans who could place the package on the airplane carefully.

Another possible variation to the above-described system is to provide a rescheduling system on each tag. For example, if a tag associated with a package is waiting to be placed on an airplane, but the airplane is delayed, the tag could "ask" to be placed instead on a different flight, perhaps, even on a different airline. For a highly tag-based system, each tag is provided with its own real-time clock and access to airline schedules, with freight rates. A tag programmed to get its package to a certain destination can access (such as through the transceiver 202, or a separate infrared link, not shown) a schedule to its memory 230 and then look for the next available flight on any airline, or else compare all available flights within a certain time frame, such as the next 24 hours, and choose the least expensive one. In a more general sense, it is conceivable, using the basic principle of the above-described invention, to devise a system in which decisions can be made at each individual tag to select a route to a desired destination which can individually adjust to changing circumstances, particularly if the tag is provided either by external communication or by information pre-programmed in memory 230, with information about cost alternatives, particularly among competing transport services. (In the claims herein, a schedule, such as of flights, is defined as comprising a list of "transports," a transport being defined broadly as a transportation option. Thus, a tag having access to airline, postal, and trucking schedules could conceivably make comparisons among different modes of transportation.) Also, such a "costing" system may take into account non-monetary costs in deciding on a route: for example, the route chosen by a tag may try to minimize cost given that the package must arrive by a certain date and time, or the route chosen by a tag may take into account features such as "registered mail" versus ordinary delivery guarantees.

Finally, it is conceivable, using a variation of the basic principle of the present invention, to provide a system for electronic payment of transport costs via each package tag. If package tags can dynamically take advantage of changing circumstances, such as comparative costs of different transport systems, in order to change their routing, then it is likely that the cost that must be finally paid to transport any given package will have to be calculated by the processor in the tag. Given suitable support for electronic cash transfers, it is conceivable to provide a system in which packages pay for each segment of their journey as that segment is taken. One basic technique by which such a pay-as-you-go system is facilitated is to have each package tag 100 transmit a "payment signal" of an identifiable code to external apparatus, such as to a location transceiver 20 at a desired destination node, such as at a particular airport or in a truck belonging to a particular transport service. The payment signal is transmitted in response to the tag recieving the desired location code. The effect of an appropriate payment signal, which may include a field for the amount of money to be paid for the leg of the journey, on the location transceiver 20 would be to record a payment between a proprietor of the package and a proprietor of the location node. Such a system would avoid the trouble of separate billing, and billing changes as rerouting decisions occur, among independent transport services. If an electronic funds management feature within the above-described system is constructed, it may be required that individual tags have particular features, such a security and tamper prevention.

A designer of a system according to the present invention will choose a level of generality for instructions on each tag which is most useful under given constraints. If relatively detailed instructions are placed on each tag, such as a list of what specific trucks or aircraft the package is to be loaded on in what sequence, more "passive" devices can be placed in geographical locations along the routes in a system, but more sophistication will be required on each tag, and the programmer of the tag must know in advance what route is to be taken to the destination. If a system is provided in which all the sender must program on a tag is on the level of "Be at this address in Texas within 48 hours," either the equipment along the route must be endowed with decision-making capabilities, or the tag itself must have automated access to information which will enable the tag to automatically plan its own route, such as airline schedules, etc. Also, the decision of what level of generality will be accepted by a tag will further depend on how "universal" a system is desired, i.e., on to what extent tags must be compatible with disparate systems owned by different proprietors.

In order to maintain a long life of the battery used on a tag 100, a communication transceiver that powers on only when within range of a location transceiver can be used. The transceiver can use a low-power sensing mechanism that detects the presence of a suitable field that is emanated by each location transceiver. Detection of this field causes the tag to power up its more power-hungry communications transceiver for regular sending and receipt of messages. Low-power field sensing devices of the sort described are well known to practitioners of the field of wireless communications.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

We claim:

1. A method of managing a plurality of non-self-propelled packages in a distribution system, comprising the steps of:
   physically associating with each package a package transceiver including a processor associated therewith;
   disposing at each of a plurality of fixed nodes in the distribution system a location transceiver, each location transceiver adapted to communicate a unique location code to a package transceiver at the node;
   programming each processor with a destination code representative of a location in the distribution system where the package is intended to be disposed; and a package transceiver transmitting an activity signal in response to receiving a location code of a location transceiver related to the destination code.

2. The method of claim 1, further comprising the step of the activity signal causing an external apparatus at the node related to the destination code to perform a physical act on the package.

3. The method of claim 2, further comprising the step of the activity signal causing an external apparatus at the node related to the destination code to cause the package to be retained near the node.

4. The method of claim 1, the programming step including the step of programming each processor with a sequence of location codes representative of a series of locations in the distribution system where the package is intended to be disposed; and further including the step of a package transceiver transmitting an activity signal in response to receiving the location code of the location transceiver related to a destination code in the sequence.

5. The method of claim 1, further comprising the step of a package transceiver transmitting a signal consistent with the package associated therewith requiring special handling.

6. The method of claim 1, further comprising the steps of a location transceiver transmitting a query code to a package transceiver in a predetermined physical relationship with the location transceiver;

the package transceiver in said predetermined physical relationship with the location transceiver transmitting the destination code programmed therein in response to said query code;

said destination code causing an external apparatus to direct the package associated with said package transceiver toward a node associated with said destination code.

7. The method of claim 1, further comprising the step of a package transceiver transmitting a distress signal in response to not receiving the location code of the location transceiver related to the destination code after a predetermined time period.

8. The method of claim 7, the step of transmitting a distress signal including the step of the package transceiver emitting an audible signal.

9. The method of claim 7, the step of transmitting a distress signal including the step of the package transceiver transmitting a message via a cellular telephone system.

10. The method of claim 7, the step of transmitting a distress signal including the step of transmitting a location code last received by the package transceiver.

11. The method of claim 1, the programming step including the step of programming each package transceiver with a sequence of location codes representative of a series of locations in the distribution system where the package is intended to be disposed; and further comprising the steps of:

a package transceiver transmitting an activity signal in response to receiving the location code of the: location transceiver related to a location code in the sequence; and in response to not receiving the location code of the location transceiver related to a location code at a predetermined position in the sequence of location codes after a predetermined time period, the package transceiver transmitting an activity signal consistent with causing external equipment to move the package associated with the package transceiver to a location consistent with a previous location code in the sequence.

12. The method of claim 1, further comprising the steps of a package transceiver transmitting a payment signal in response to receiving the location code of the location transceiver related to the destination code; and an external apparatus related to the destination code accepting the payment signal, the payment signal having an effect of recording a payment between a proprietor of the package and a proprietor of the external apparatus.

13. The method of claim 1, further comprising the steps of a package transceiver accessing data relating to a schedule of a transport system for transporting the package, the schedule comprising a list of available transports; and the package transceiver transmitting an activity signal consistent with causing external equipment to move the package associated with the package transceiver to a location consistent with the, package being placed on a selected transport from the schedule.

14. The method of claim 13, further comprising the steps of the package transceiver accessing data relating to a schedule of a transport system for transporting the package, the, schedule comprising a list of available transports and costs associated with each transport; and the package transceiver taking into account a cost of each possible transport to select a transport from the schedule.

15. A tracking apparatus adapted to be attached to a non-self-propelled package within a distribution system, comprising:

a transceiver; and a processor operatively associated with the transceiver, the processor including means for retaining a destination code representative of a location in the distribution system where the package is intended to be disposed, means for recognizing a location code broadcast from an external location transceiver, and means for transmitting an activity signal in response to recognizing a location code of the location transceiver related to the destination code.

16. The apparatus of claim 15, the processor further including means for recognizing a query code broadcast from an external location transceiver, and means for transmitting the destination code programmed therein in response to said query code.

17. The apparatus of claim 15, the processor further including means for transmitting a distress signal in response to not receiving the location code of the location transceiver related to the destination code after a predetermined time period.

18. The apparatus of claim 17, the means for transmitting a distress signal including means for transmitting a message via a cellular telephone system.

19. The apparatus of claim 17, the means for transmitting a distress signal including means for transmitting a location code last received by the package transceiver.

20. The apparatus of claim 15, further comprising means for retaining a sequence of location codes representative of a series of locations in the distribution system where the package is intended to be disposed; and means for transmitting a distress signal in response to not receiving a location code in the sequence of location codes after a predetermined time period.

21. The apparatus of claim 15, attached to a container holding a second package therein, the second package attached to a second tracking apparatus including a second transceiver and a second processor, the second processor including means for recognizing a location code, the processor further including means for broadcasting a unique location code to said second tracking apparatus associated with said second package.

22. The apparatus of claim 21, the processor further including means for broadcasting a query code to said second tracking apparatus, the second tracking apparatus further including means for transmitting a destination code programmed therein in response to receiving said query code; and means for recognizing a destination code transmitted by said second tracking apparatus.

23. The apparatus of claim 15, the processor further comprising means for accessing data relating to a schedule of a transport system for transporting the package, the schedule comprising a list of available transports; and means for transmitting an activity signal consistent with causing external equipment to move the package associated with the package transceiver to a location consistent with the package being placed on a selected transport from the schedule.

24. The apparatus of claim 23, further comprising means for accessing data relating to a schedule of a transport system for transporting the package, the schedule comprising a list of available transports and costs associated with each transport; and means for taking into account a cost of each possible transport to select a transport from the schedule.

* * * * *